US008681848B2

(12) United States Patent
Hu et al.

(10) Patent No.: US 8,681,848 B2
(45) Date of Patent: Mar. 25, 2014

(54) LINEAR SYSTEM FOR LINK TRAINING

(75) Inventors: Yaqi Hu, Plano, TX (US); Yanli Fan, Allen, TX (US); Huawen Jin, Plano, TX (US); Ulrich Schacht, Lower Saxony (DE); Karl Muth, Richardson, TX (US); Mark W. Morgan, Allen, TX (US)

(73) Assignees: Texas Instruments Incorporated, Dallas, TX (US); Texas Instruments Deutschland GmbH, Freising (DE)

( * ) Notice: Subject to any disclaimer, the term of this patent is extended or adjusted under 35 U.S.C. 154(b) by 243 days.

(21) Appl. No.: 13/284,690

(22) Filed: Oct. 28, 2011

(65) Prior Publication Data
US 2013/0107933 A1    May 2, 2013

(51) Int. Cl.
*H03H 7/30* (2006.01)
*H03H 7/40* (2006.01)
*H03K 5/159* (2006.01)

(52) U.S. Cl.
USPC .......................... 375/229; 333/28 R; 375/259

(58) Field of Classification Search
USPC ......... 375/229–230, 232, 233, 259–260, 345, 375/350; 333/18, 28 R; 330/124 R, 304; 708/300, 322, 323
See application file for complete search history.

(56) References Cited

U.S. PATENT DOCUMENTS

| | | | | |
|---|---|---|---|---|
| 4,677,647 | A * | 6/1987 | Aoyagi | 375/344 |
| 5,272,449 | A * | 12/1993 | Izawa | 330/2 |
| 6,353,629 | B1 * | 3/2002 | Pal | 375/222 |
| 6,415,003 | B1 | 7/2002 | Raghavan | |
| 6,421,381 | B1 | 7/2002 | Raghavan | |
| 7,050,517 | B1 | 5/2006 | Sallaway et al. | |
| 7,058,187 | B2 * | 6/2006 | Ohta | 381/98 |
| 7,180,941 | B2 | 2/2007 | Sivadas et al. | |
| 7,495,983 | B2 * | 2/2009 | Kim | 365/205 |
| 2003/0016770 | A1 | 1/2003 | Trans et al. | |
| 2005/0019036 | A1 * | 1/2005 | Soto et al. | 398/135 |
| 2006/0188043 | A1 | 8/2006 | Zerbe et al. | |
| 2008/0291336 | A1 * | 11/2008 | Kim et al. | 348/729 |
| 2009/0015331 | A1 * | 1/2009 | Segarra | 330/254 |
| 2009/0304066 | A1 | 12/2009 | Chmelar et al. | |
| 2010/0194478 | A1 | 8/2010 | Maillard | |
| 2011/0170632 | A1 | 7/2011 | Danzig et al. | |

OTHER PUBLICATIONS

"A 4-Channel 1.25-10.3 Gb/s Backplane Transceiver Macro With 35 dB Equalizer and Sign-Based Zero-Forcing Adaptive Control," IEEE Journal of Solid-State Circuits, vol. 44, No. 12, Dec. 2009, pp. 3547-3559 (Hidaka, et al.).
PCT Search Report mailed Mar. 22, 2013.

* cited by examiner

*Primary Examiner* — Jean B Corrielus
(74) *Attorney, Agent, or Firm* — Alan A. R. Cooper; W. James Brady, III; Frederick J. Telecky, Jr.

(57) ABSTRACT

An apparatus for equalizing channels is provided, which is generally transparent to link training. The apparatus generally includes equalization paths formed by an input circuit, a crossbar, and an output circuit and a controller. Each equalization path is coupled to at least one of the channels, and a controller has a VGA loop, a crossbar loop, and a driver loop. The AGC loop receives a first reference voltage and provides a gain control signal to the input circuit, and the gain control network comprises a replica of at least one of the equalization paths. The crossbar loop receives a second reference voltage and provides a crossbar control signal to the crossbar. The driver loop receives a third reference voltage and provides a driver control signal for the output circuit.

20 Claims, 4 Drawing Sheets

LINEAR SYSTEM FOR LINK TRAINING

TECHNICAL FIELD

The invention relates generally to signal conditioning system and, more particularly, to linear signal conditioning system with gain control.

BACKGROUND

Turning to FIG. 1, an example of a conventional Automatic Gain Control (AGC) circuit 100 can be seen. While the AGC circuit 100 is generally referred to having the characteristic of "gain control," it is actually an Automatic Level Control (ALC) circuit. In operation, the level detector 104 detects the level of the output signal OUT (usually peak level), and the controller 106 compares the level of the output signal OUT against a fixed (reference) level REF. Based on the results of this comparison, the controller 106 can then adjust, with control signal CNTL, the gain of the Variable Gain Amplifier (VGA) to generally maintain level of the output signal OUT. When the AGC circuit 100 is used in a linear signal conditioning device (such as a linear equalizer), the AGC circuit 100 is non-transparent to link training (i.e., the level of the output signal OUT does not respond to level changes in the input signal IN during link training) and may prevent optimal system configuration in terms of bit error rate, power, and electromagnetic interference (EMI). Additionally, limiting (non-linear) devices can distort the transmitter waveform and make it difficult for the receiver Decision Feedback Equalizer (DFE) to recover the data correctly. Thus, there is a need for an improved AGC circuit.

Some examples of conventional system are: U.S. Pat. No. 6,415,003; U.S. Pat. No. 6,421,381; U.S. Pat. No. 7,050,517; U.S. Patent Pre-Grant Publ. No. 2003/0016770; and Hidaka et al., "A 4-Channel 1.25-10.3 Gb/s Backplane Transceiver Macro With 35 dB Equalizer and Sign-Based Zero-Forcing Adaptive Control," *IEEE J. of Solid-State Circuits*, Vol. 44, No. 12, December 2009.

SUMMARY

An embodiment of the present invention, accordingly, provides an apparatus for equalizing a plurality of channels that is generally transparent to link training. The apparatus comprises a plurality of equalization paths formed by an input circuit, a crossbar, and an output circuit, wherein each equalization path is coupled to at least one of the channels; and a controller having: a gain control loop that receives a first reference voltage and that provides a gain control signal to the input circuit, wherein the gain control loop includes a replica of at least one of the equalization paths; a crossbar loop that receives a second reference voltage and that provides a crossbar control signal to the crossbar; and a driver loop that receives a reference voltage and that provides a driver control signal for the output circuit.

In accordance with an embodiment of the present invention, the input circuit further comprises a plurality of variable gain amplifiers (VGAs), wherein each VGA is coupled to at least one of the channels and is coupled to the crossbar.

In accordance with an embodiment of the present invention, the output circuit further comprises a plurality of drivers that are each coupled to the crossbar.

In accordance with an embodiment of the present invention, the crossbar further comprises a plurality multiplexers wherein each multiplexer is coupled to each VGA and is coupled to at least one of the drivers.

In accordance with an embodiment of the present invention, the gain control loop further comprises: a replica VGA that receives the first reference voltage; a replica multiplexer that is couple to the replica VGA; a replica driver that is coupled to the replica multiplexer; and a control network that receives the first reference voltage, that is coupled to the replica driver, and that is coupled to each VGA of the input circuit.

In accordance with an embodiment of the present invention, the replica multiplexer further comprises a first replica multiplexer, and wherein the control network further comprises a first control network, and wherein the crossbar loop further comprises: a second replica multiplexer receives the second reference voltage; and a second control network that receives the second reference voltage, that is coupled to the second replica multiplexer, and that is coupled to each multiplexer of the crossbar.

In accordance with an embodiment of the present invention, the driver loop further comprises: a second replica driver receives the third reference voltage; and a third control network that receives the third reference voltage, that is coupled to the second replica driver, and that is coupled to each driver of the output circuit.

In accordance with an embodiment of the present invention, each of the first, second, and third control networks further comprise: a first voltage divider that receives receive one of the first, second, and third reference voltages; a second voltage divider is coupled to one of the first replica driver, the second replica multiplexer, and the second replica driver; and a control signal generator that is coupled between the first and second voltage dividers.

In accordance with an embodiment of the present invention, the control signal generator further comprises: a difference amplifier that is coupled to each of the first and second voltage dividers; a filter that is coupled to the difference amplifier; a voltage-to-current (V2I) converter that is coupled to the filter; and a current mirror circuit that is coupled to the V2I converter.

In accordance with an embodiment of the present invention, an apparatus is provided. The apparatus comprises a transmitter having a plurality of channels; a transmission medium that is coupled to the transmitter; a receiver that is coupled to the transmission medium, wherein the receiver includes a linear equalizer that equalizes the plurality of channels and that is generally transparent to link training, and wherein the linear equalizer includes: a plurality of equalization paths formed by an input circuit, a crossbar, and an output circuit, wherein each equalization path is coupled to at least one of the channels; and a controller having: a gain control network that receives a first reference voltage and that provides a gain control signal to the input circuit, wherein the gain control network includes a replica of at least one of the equalization paths; a crossbar loop that receives a second reference voltage and that provides a crossbar control signal to the crossbar; and a driver loop that receives a this reference voltage and that provides a driver control signal for the output circuit.

In accordance with an embodiment of the present invention, the receiver further comprises a decision feedback equalizer (DFE), and wherein the linear equalizer is coupled between the transmission medium and the DFE.

In accordance with an embodiment of the present invention, the apparatus is a 10GBase-KR compliant communication system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
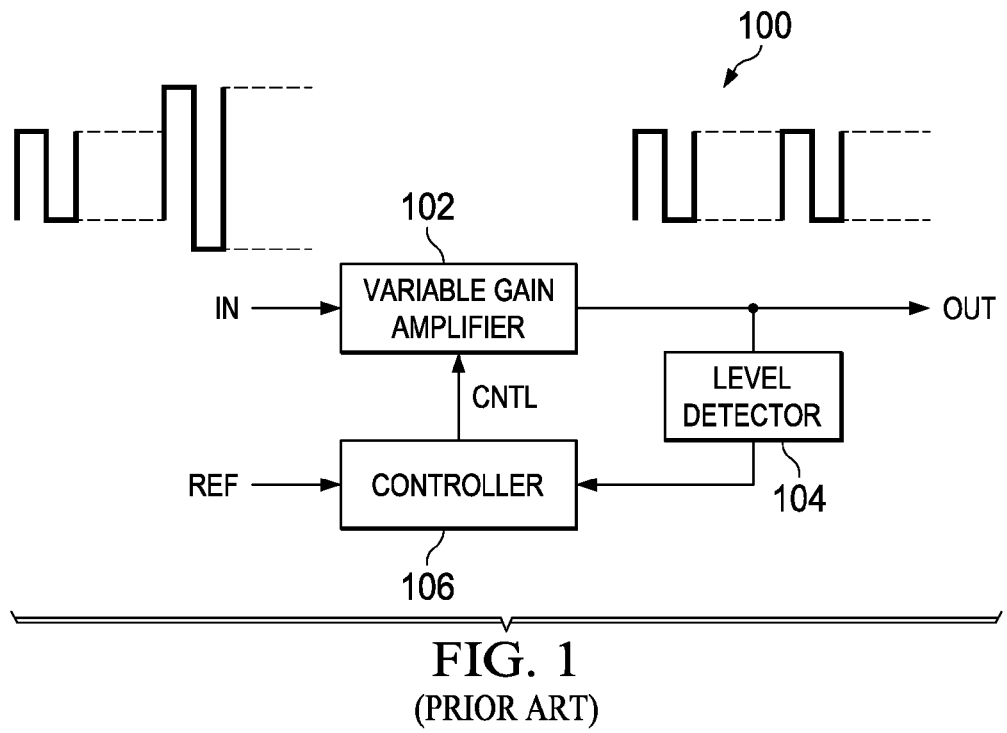
FIG. 1 is a diagram of an example of a conventional AGC circuit.

Refer now to the drawings wherein depicted elements are, for the sake of clarity, not necessarily shown to scale and wherein like or similar elements are designated by the same reference numeral through the several views.

Figure 2:
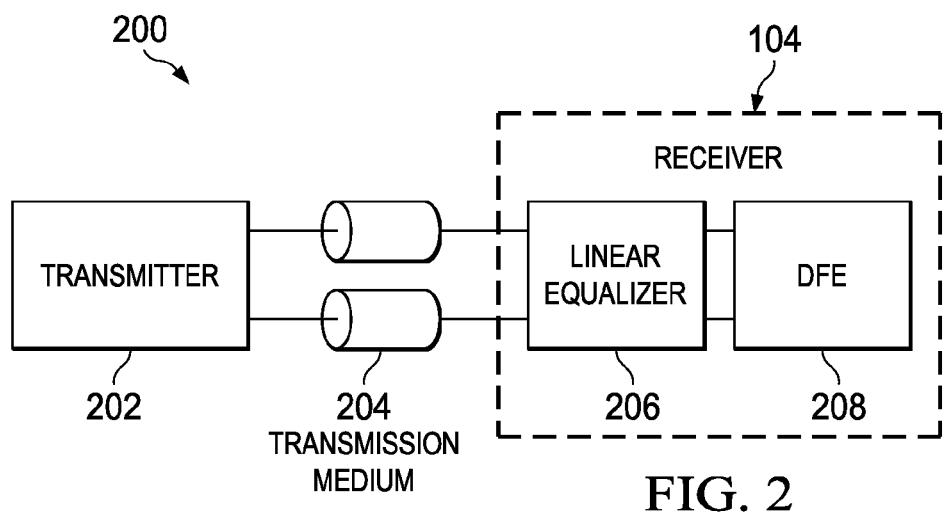
FIG. 2 is a diagram of an example of a system in accordance with an embodiment of the present invention.

Turning to FIG. 2, an example of a communication system 200 in accordance with an embodiment of the present invention can be seen. This communication system 200 can, for example, be an Ethernet system compliant with the standards set forth in Institute of Electrical and Electronics Engineers (IEEE) 802.3ba, dated Jun. 17, 2010, and/or IEEE 802.3ap dated Jun. 25, 2010. Preferably, this system 200 can be compliant with 10GBase-KR (which is associated with these standards). Additionally, each of these standards is incorporated herein by reference for all purposes. This system 200 generally includes a transmitter 202 that can include several channels (i.e., 4 channels), a transmission medium 204 (which can be an Ethernet cable), and a receiver 206. The receiver generally includes a linear equalizer 206 and DFE 208 that can compensate (for example) for EMI and inter-symbol interference (ISI).

Figure 3:
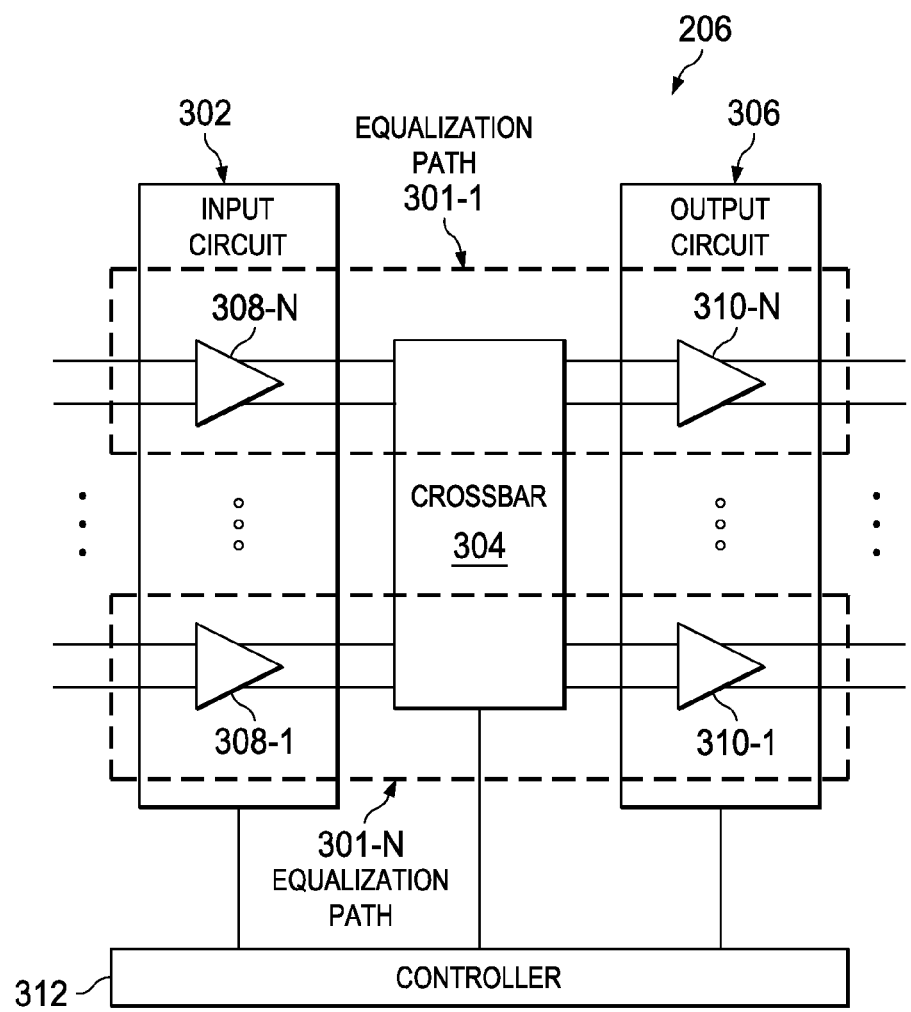
FIG. 3 is a diagram of an example of the linear equalizer of FIG. 2.

The linear equalizer 206 can be seen in greater detail in FIG. 3. As shown, the equalizer 206 generally includes equalization paths 301-1 to 301-N, where each equalization path 301-1 to 301-N generally corresponds to one of the channels. These paths 301-1 to 301-N are formed by portions of an input circuit 302, crossbar 304, and output circuit 306. Namely, the input circuit includes variable gain amplifiers (VGAs) 308-1 to 308-N (which each generally correspond to at least one of the channels), and the output circuit 306 generally includes drivers 310-1 to 310-N (which, again, each generally corresponds to at least one of the channels). The crossbar 304 generally includes multiplexers that are each coupled to each of the VGAs 308-1 to 308-N and to a driver 310-1 to 310-N so as to be generally associated with one of the channels. For the sake of simplicity of the drawings, the details of the crossbar 304 are not shown, and use of the crossbar 304 allows for dynamically reconfigurable equalization paths.

Figure 4:
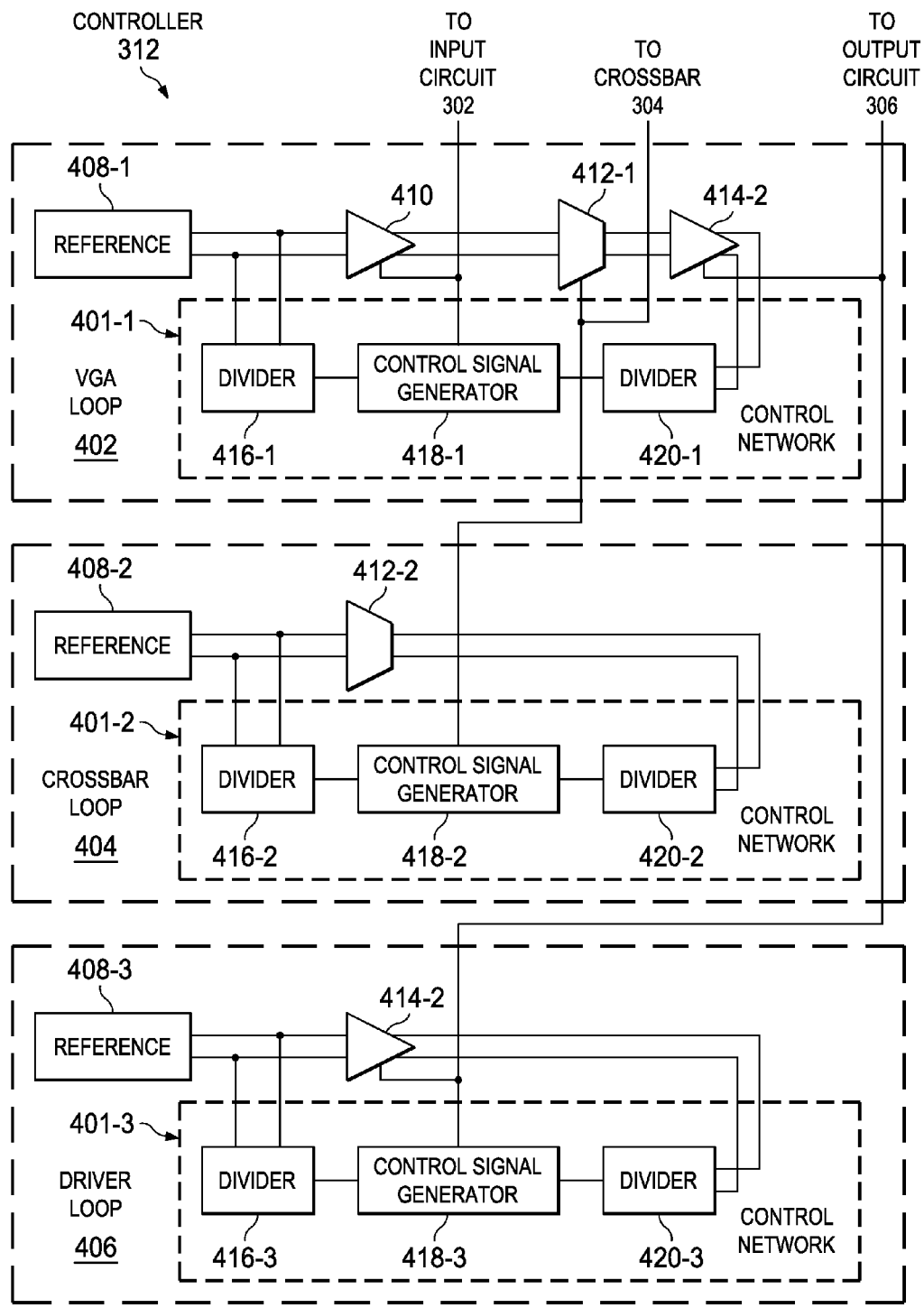
FIG. 4 is a diagram of an example of the controller of FIG. 3.

Also included within the linear equalizer 206 is a controller 312, which is shown in greater detail in FIG. 4. As shown, the controller 312 is generally comprised of a VGA loop 402, a crossbar loop 404, and a driver loop 406 (as well as other components that have been omitted for the sake of simplicity). Each of these loops 402, 404, and 406 is a replica of at least a portion of at least one of the equalization paths 301-1 to 301-N. This means that the components of these loops 402, 404, and 406 have components that are scaled down to reduce power/area, but and have gains equal or proportional components within the equalization paths 301-1 to 301-N. Specifically, the VGA loop is generally comprised of a replica VGA 410 (which can be a replica of at least one of VGAs 308-1 to 308-N), a replica multiplexer 412-1 (which can be a replica of at least one of the multiplexers of the crossbar 304), and a replica driver 412-1 (which can be a replica of at least one of the drivers 310-1 to 310-N). The crossbar loop 404 includes a replica multiplexer 412-2, and the driver loop generally includes a replica driver 414. Each of these loops 402, 404, and 406 also includes a control network 401-1 to 401-3, respectively, that employ a voltage dividers 416-1 to 416-3 and 420-1 to 420-3 and control signal generators 418-1 to 418-3.

In operation, these loops 402, 404, and 406 compare the output level to the input level (rather than the reference level) to generally maintain the channel gain (rather than the output level), which allows link training to be transparent. A reference voltage for each of these loops 402, 404, and 406 is generated by reference circuits 408-1 to 408-3 (which are typically bandgap circuits). The VGA loop 402 can then generate a gain control signal to adjust the gains of VGAs 308-1 to 308-N (where there is usually one signal for each VGA 308-1 to 308-N) and generally functions as the main AGC loop to (for example) remove residual errors from the equalization paths 310-1 to 310-N due to the finite loop gain. The crossbar loop 402 can generate a crossbar control signal to adjust the gains of multiplexers within the crossbar 304 (where there is usually one signal for each multiplexer), functioning generally as a nested AGC loop, and the driver loop 406 can generate a driver control signal to adjust the gains of drivers 310-1 to 310-N, (where there is usually one signal for each driver 310-1 to 310-N), functioning generally as a nested AGC loop. By using these three loops 402, 404, and 406, gain control can be maintained over process, supply voltage, and process variation, and, by employing the nested AGC loops, in particular, gain variation of each stage can be controlled while not introducing excessive noise amplification and nonlinearity. Additionally, with the nested (localized) control loops, the gains are independent of configuration of equalization paths 301-1 to 301-N.

In order to generate the control signals from control networks 401-1 to 401-3, control signal generators 418-1 to 418-3 (which can be seen in greater detail in FIG. 5 and which are hereinafter referred to as 418) make comparisons between the input and output levels. Namely, the control signal generator 418 uses a difference amplifier 502 that compares the levels between the input and output signals (after passing through dividers 416-1 to 416-3 and 420-1 to 420-3). This difference is then filtered with filter 504 (which can, for example, be a low pass resistor-capacitor filter and which assists in maintaining loop stability) and converted to a current with voltage-to-current (V2I) converter 506. Using the current (which is proportional to the difference between the input and output levels), current mirror circuit 508 can generate currents used to control the gains of the VGAs 308-1 to 308-N, multiplexers, or driver 310-1 to 310-N, as appropriate. The control currents are also more immune to local ground fluctuation than control voltages.

Figure 5:
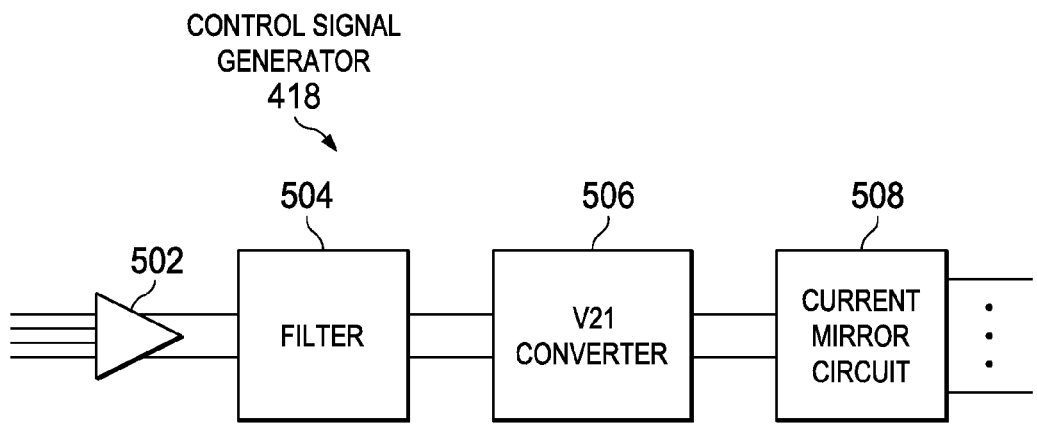
FIG. 5 is a diagram of an example of control signal generator of FIG. 4.
Figure 6:
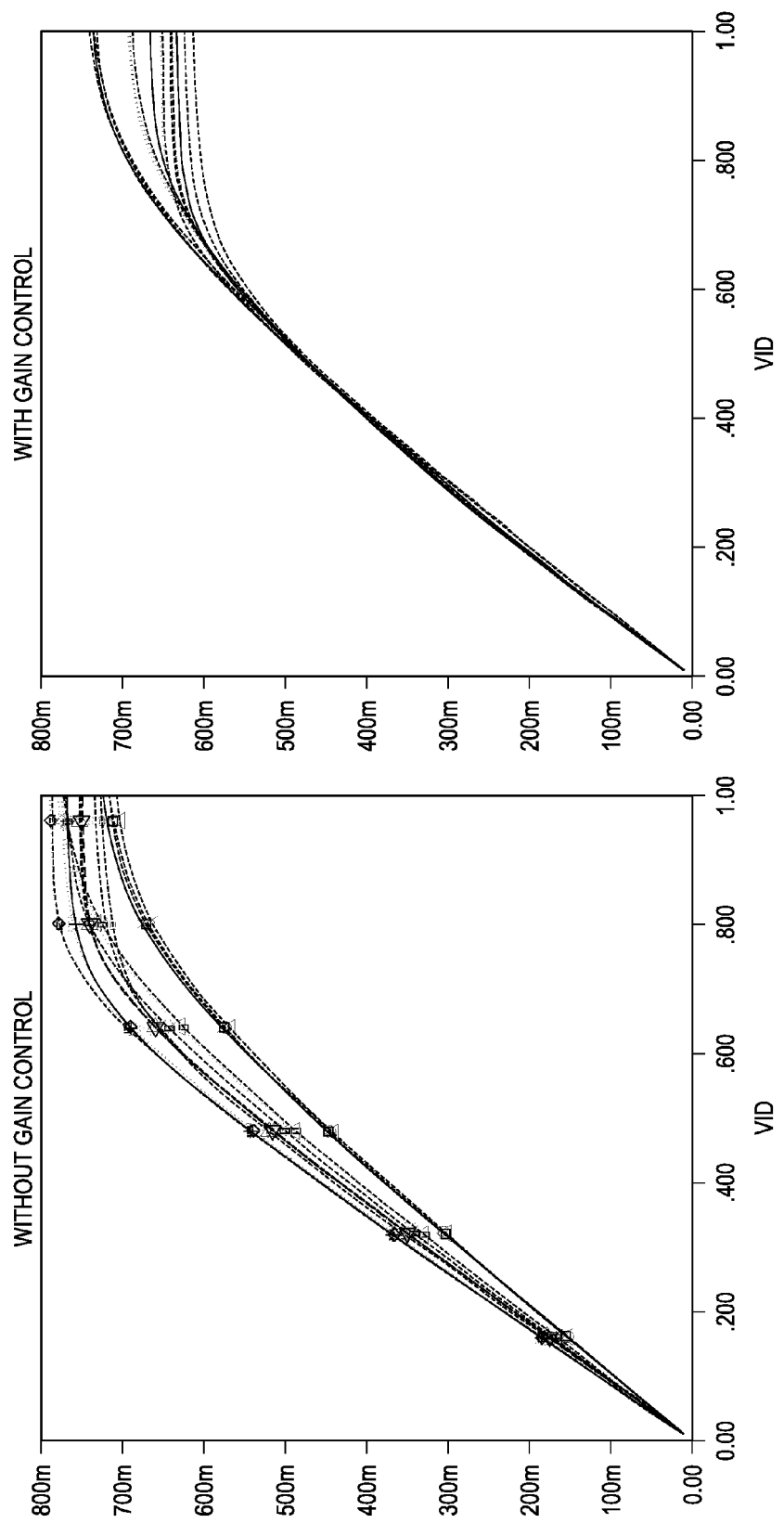
FIG. 6 is a diagram depicting the function of the linear equalizer of FIG. 3.

Turning now to FIG. 6, a comparison between the system 200 with and without gain control can be seen. As shown, the ratio between input and output voltage (i.e. gain) for the system 200 with gain control is much less variant than without gain control over a broad range. It should also be noted that the circuits of FIGS. 3-5 depict a differential arrangement, but it is also possible to employs the equalizer 206 in a single ended system.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus for equalizing a plurality of channels that is generally transparent to link training, the apparatus comprising:
   a plurality of equalization paths formed by an input circuit, a crossbar, and an output circuit, wherein each equalization path is coupled to at least one of the channels and wherein the crossbar is connected between the input circuit and the output circuit; and
   a controller having:
   a gain control loop that receives a first reference voltage and that provides a gain control signal to the input circuit, wherein the gain control loop includes a replica of at least one of the equalization paths;
   a crossbar loop that receives a second reference voltage and that provides a crossbar control signal to the crossbar; and
   a driver loop that receives a third reference voltage and that provides a driver control signal for the output circuit.

2. The apparatus of claim 1, wherein the input circuit comprises a plurality of variable gain amplifiers (VGAs), wherein each VGA is coupled to at least one of the channels and is coupled to the crossbar.

3. The apparatus of claim 2, wherein the output circuit comprises a plurality of drivers that are each coupled to the crossbar.

4. The apparatus of claim 3, wherein the crossbar comprises a plurality multiplexers wherein each multiplexer is coupled to each VGA and is coupled to at least one of the drivers.

5. The apparatus of claim 4, wherein the gain control loop further comprises:
   a replica VGA that receives the first reference voltage;
   a replica multiplexer that is coupled to the replica VGA;
   a replica driver that is coupled to the replica multiplexer; and
   a control network that receives the first reference voltage, that is coupled to the replica driver, and that is coupled to each VGA of the input circuit.

6. The apparatus of claim 5, wherein the replica multiplexer further comprises a first replica multiplexer, and wherein the control network further comprises a first control network, and wherein the crossbar loop further comprises:
   a second replica multiplexer receives the second reference voltage; and
   a second control network that receives the second reference voltage, that is coupled to the second replica multiplexer, and that is coupled to each multiplexer of the crossbar.

7. The apparatus of claim 6, wherein the driver loop further comprises:
   a second replica driver receives the third reference voltage; and
   a third control network that receives the third reference voltage, that is coupled to the second replica driver, and that is coupled to each driver of the output circuit.

8. The apparatus of claim 7, wherein each of the first, second, and third control networks further comprise:
   a first voltage divider that receives receive one of the first, second, and third reference voltages;
   a second voltage divider is coupled to one of the first replica driver, the second replica multiplexer, and the second replica driver; and
   a control signal generator that is coupled between the first and second voltage dividers.

9. The apparatus of claim 8, wherein the control signal generator further comprises:
   a difference amplifier that is coupled to each of the first and second voltage dividers;
   a filter that is coupled to the difference amplifier;
   a voltage-to-current (V2I) converter that is coupled to the filter; and
   a current mirror circuit that is coupled to the V2I converter.

10. An apparatus comprising:
    a transmitter having a plurality of channels;
    a transmission medium that is coupled to the transmitter;
    a receiver that is coupled to the transmission medium, wherein the receiver includes a linear equalizer that equalizes the plurality of channels and that is generally transparent to link training, and wherein the linear equalizer includes:
    a plurality of equalization paths formed by an input circuit, a crossbar, and an output circuit, wherein each equalization path is coupled to at least one of the channels and wherein the crossbar is connected between the input circuit and the output circuit and
    a controller having:
    a gain control loop that receives a first reference voltage and that provides a gain control signal to the input circuit, wherein the gain control loop includes a replica of at least one of the equalization paths;
    a crossbar loop that receives a second reference voltage and that provides a crossbar control signal to the crossbar; and
    a driver loop that receives a third reference voltage and that provides a driver control signal for the output circuit.

11. The apparatus of claim 10, wherein the input circuit comprises a plurality of variable gain amplifiers (VGAs), wherein each VGA is coupled to at least one of the channels and is coupled to the crossbar.

12. The apparatus of claim 11, wherein the output circuit comprises a plurality of drivers that are each coupled to the crossbar.

13. The apparatus of claim 12, wherein the crossbar comprises a plurality multiplexers wherein each multiplexer is coupled to each VGA and is coupled to at least one of the drivers.

14. The apparatus of claim 13, wherein the gain control loop further comprises:
    a replica VGA that receives the first reference voltage;
    a replica multiplexer that is coupled to the replica VGA;

a replica driver that is coupled to the replica multiplexer; and a control network that receives the first reference voltage, that is coupled to the replica driver, and that is coupled to each VGA of the input circuit.

15. The apparatus of claim 14, wherein the replica multiplexer further comprises a first replica multiplexer, and wherein the control network further comprises a first control network, and wherein the crossbar loop further comprises:
   a second replica multiplexer receives the second reference voltage; and
   a second control network that receives the second reference voltage, that is coupled to the second replica multiplexer, and that is coupled to each multiplexer of the crossbar.

16. The apparatus of claim 15, wherein the driver loop further comprises:
   a second replica driver receives the third reference voltage; and
   a third control network that receives the third reference voltage, that is coupled to the second replica driver, and that is coupled to each driver of the output circuit.

17. The apparatus of claim 16, wherein each of the first, second, and third control networks further comprise:
   a first voltage divider that receives receive one of the first, second, and third reference voltages;
   a second voltage divider is coupled to one of the first replica driver, the second replica multiplexer, and the second replica driver; and
   a control signal generator that is coupled between the first and second voltage dividers.

18. The apparatus of claim 17, wherein the control signal generator further comprises:
   a difference amplifier that is coupled to each of the first and second voltage dividers;
   a filter that is coupled to the difference amplifier;
   a voltage-to-current (V2I) converter that is coupled to the filter; and
   a current mirror circuit that is coupled to the V2I converter.

19. The apparatus of claim 18, wherein the receiver further comprises a decision feedback equalizer (DFE), and wherein the linear equalizer is coupled between the transmission medium and the DFE.

20. The apparatus of claim 19, wherein the apparatus is a 10 Gigabit backplane link with scrambled encoding (10GBase-KR) compliant communication system.

\* \* \* \* \*